United States Patent [19]

Wilkening

[11] Patent Number: 5,024,793
[45] Date of Patent: Jun. 18, 1991

[54] METHOD FOR MANUFACTURING REFRACTORY OXIDE-CARBON BRICKS

[75] Inventor: Siegfried Wilkening, Alfter-Oedekoven, Fed. Rep. of Germany

[73] Assignee: Vereinigte Aluminum-Werke Aktiengesellschaft, Bonn, Fed. Rep. of Germany

[21] Appl. No.: 191,607

[22] Filed: May 9, 1988

[30] Foreign Application Priority Data

Jul. 5, 1987 [DE] Fed. Rep. of Germany ....... 3715178

[51] Int. Cl.$^5$ .............................................. C04B 35/64
[52] U.S. Cl. .................................... 264/29.7; 264/63
[58] Field of Search ................................. 264/29.7, 63

[56] References Cited

U.S. PATENT DOCUMENTS

| | | | |
|---|---|---|---|
| 4,059,662 | 11/1977 | Murakami | 264/63 |
| 4,510,191 | 4/1985 | Kagami | 264/63 |
| 4,532,091 | 7/1985 | Dias | 264/63 |
| 4,634,685 | 1/1987 | Pohl | 264/63 |
| 4,775,504 | 10/1988 | Shikano | 264/63 |

*Primary Examiner*—James Derrington
*Attorney, Agent, or Firm*—Darby & Darby

[57] ABSTRACT

A method for the manufacture of refractory, bricks that are resistant to molten iron and slag. The bricks are made of refractory oxides and/or the corresponding hydroxides and carbon by mixing fine-particle refractory oxides and/or the corresponding hydroxides with pitch to form a homogeneous green mixture, heating the green mixture in the presence of carbon to form a solid thermally stable sintered product of oxide and carbon, reducing the sintered product into smaller size particles, binding the reduced sintered particles with a mixture of refractory oxide and/or corresponding hydroxide and pitch, compacting the thus obtained substance into a green molded article, and firing the green molded article in a reducing atmosphere to form refractory bricks.

16 Claims, No Drawings

METHOD FOR MANUFACTURING REFRACTORY OXIDE-CARBON BRICKS

FIELD OF THE INVENTION

A method for manufacturing refractory, iron and slag-resistant bricks comprising refractory oxides and carbon. The products of the invention are useful for lining metallurgical vessels.

BACKGROUND OF THE INVENTION

Refractory products of oxide-carbon mixtures are known in different forms. In the so-called tar-dolomite and tar-magnesium bricks, a mixture of calcined dolomite, calcined magnesite or sintered magnesia is bound with tar or pitch. The binding tar or the binding pitch is converted to binding coke by tempering, or low temperature treatment below coking and increased heating of the lined vessels. Heat and cold-curable synthetic resins with relatively high coke yield are also used as binding agents for this purpose in place of the tar and pitch. To increase the slag resistance, fine graphite and coke powder are additionally added to such bricks up to approximately 20 percent by weight. Oxides other than those mentioned above can serve as basic materials in the manufacture of carbon-bound oxide bricks, including sintered aluminum oxide, sintered zirconium oxide or sintered mullite (chemical formula $3Al_2O_3 \cdot 2SiO_2$).

Another group of refractory products which is known in the art are the ceramic-bound refractory bricks, which contain in addition to the materials identified above, carbon or natural graphite. The clay-graphite substances (also known as plumbago) are primarily used in the manufacture of melting crucibles and are a known example of this group.

With respect to carbon bricks it has proven desirable for some applications, such as those in which the brick must come into contact with pig iron, to add fine-particle oxides, in particular aluminum oxide, in quantities of up to approximately 10 percent by weight.

The resistance to gaseous and liquid substances of an oxide-carbon combination brick is not solely a function of the oxide/carbon ratio in the mixture and the individual resistance of its components, but also of the manner in which they are mixed and fabricated. In the manufacture of large-sized refractory blocks, it must further be taken into consideration that for this purpose, coarser grain fractions are required.

It is an object of the present invention to mix and bind oxides and carbon in such a way, that, on the one hand, optimum resistance against gaseous and liquid media in the metallurgical units is ensured and, on the other hand, large-sized refractory bricks can be manufactured.

A further object of the present invention is to achieve through the nature of the oxide, the additives, and the pitchbinder as well as through thermal treatment in the baking or calcining furnace, maximum strength and density of the fired intermediary product.

These and other objects of the present invention will be apparent to those of ordinary skill in the art in light of the following description and accompanying claims.

SUMMARY OF THE INVENTION

In one aspect, the present invention provides a method for the manufacture of refractory, iron and slag-resistant bricks from refractory oxides and/or corresponding hydroxides and from a carbon binder precursor which comprises the steps of mixing fine-particle refractory oxides and/or the corresponding hydroxides with pitch to form a homogeneous green mixture, coking and carbonizing the green mixture to form a solid thermally stable sintered product of oxide and carbon, breaking up and sorting the sintered product into grain fractions, binding the sintered product which was broken-up with a mixture of oxide and/or corresponding hydroxide and pitch, compacting the thus obtained substance into a green molded article, and firing the green molded article in a reducing atmosphere to form refractory bricks.

DETAILED DESCRIPTION OF THE INVENTION

In accordance with the present invention, a fine-particle powder-shaped refractory oxide is first dispersed in molten tar-pitch. As used herein, fine particle oxide is broadly defined as less than 150 $\mu$m diameter of an average particle size and preferably of an average particle size between about 20 $\mu$m and about 80 $\mu$m diameter as determined by the size distribution graph. Suitable refractory oxides for use in the present invention are those containing aluminum, titanium, magnesium and zirconium, e.g. aluminum oxide, zirconium oxide. Examples of other oxides which can be employed are calcined bauxite, mullite, zirconium sand and mixtures thereof.

The consistency of the oxide-pitch substance can vary from viscous to doughy, i.e. it should be able to flow so that it can fill container spaces when flowing, or be so plastic that it can be formed into strands with an extruder and cut into pieces or sections. A general mixing ratio between the oxide and the pitch cannot be given because it is dependent upon the properties of the materials utilized. The mixing ratio is a function of the degree of fineness and absorbability of the oxide and of the softening point and the viscosity of the binding pitch used. The binding agent fraction used is between 20 and 40 percent by weight of the total and the mixture must not consist of oxide and pitch alone. The oxide pitch substances can have added to them carbon or metal powder which affects the given properties of the refractory products. With additives such as graphite powder in quantities of 5 to 20 percent by weight, the ability of the mixture to conduct heat is increased. In order to increase the carbon fraction in the mixture, petroleum coke powder or carbon black may be added. Adding metallic silicon powder up to 20 percent by weight is advantageous, if the strength and oxidation resistance of the product produced from it are to be improved.

The oxides used in the present invention are commercially available in many different grain fractions. Sizes of less than 100 um can be obtained, for example by ball milling and air classification, as is known in the art.

The oxide pitch substances or equivalents with the above mentioned additions are subjected to a coking process in a reducing atmosphere. Ring-type baking or tunnel furnaces which are known for their use in the carbonization of carbon electrodes may be employed. Flowable substances may be carbonized in heat-resistant steel boxes lined with paper or cardboard and these may be dismountable. Doughy substances, formed into strand sections, may be embedded directly or wrapped in paper into a coke powder packing material. The oxide pitch substances are heated between the temperatures of about 200° C. and about 600° C. with a heating rate of less than 20° C./h, preferably even less than 5° C./h, the preferred range of hourly temperature increase being between about 2° C. per hour and about 20° C. per hour. The low heating rate ensures a high coke yield of the pitch as well as low porosity and high strength of the coked substance. In most instances, a maximum temperature in the carbonization and calcining process of between 950° C. to 1000° C. is sufficient; however, for reasons of thermal stability of the carbo-ceramic product and/or also due to the conversion of added silicon powder into beta-silicon carbide, heating the substance above 1000° C. may become desirable in some instances. The coking (lower temperature ranges of between 200° C. and 600° C.) and calcining (above 600° C.) step is necessary to convert the pitch binder into a solid resistant carbon material which constitutes the bond structure.

Following the carbonization and calcining treatment (alternatively referred to hereinafter as firing), the resulting solid oxide-carbon substance is crushed and prepared to form particle or grain fractions (classes of particles). The grain fractions preferably have sizes ranging between 1 mm and 16 mm. The sintered cakes are processed by crushing, milling and size classification by seiving using screens, as is known in the art. The grain fractions range from less than 100µum up to 20 mm.

From the grain fractions a dense packing filler material is prepared. The filler contains as a powder or dust fraction the oxide or oxide with additives of the type mentioned previously. The filler material comprising the oxide-carbon-grain fractions as well as the free, non-bonded oxide present as an extremely fine grain fraction, is admixed with the pitch (which is used as a binding agent) to form a moldable mixture. The moldable mixture is hereinafter referred to as the green substance or mixture. This is compacted and formed by using heated vibration using a vibration compactor and hydraulic presses into block plates or other shaped bodies. The green formed bodies are carbonized or fired up to about 1200° C. as for the production of artificial carbon products or incrementally in the manner described above. The carbon content in the oxide-carbon bricks may be adjusted to anywhere between about 10 and about 50 percent by weight, however, a carbon content of between about 15 and about 25 percent by weight is particularly preferred.

Using the method according to the present invention, carbo-ceramic bricks of extremely high homogeneity are produced, which in certain applications, are distinguished by their superior stability. Such bricks may also be used as linings for metallurgical vessels used for thermal and electrochemical processes, for stoppers and tubing used in the continuous casting of steel and for lining steel treatment devices.

The method according to the invention preferably employs synthetic refractory oxides, generated in fine-particle form mostly below 100 um. Non-limiting examples of such synthetic oxides include aluminum oxide ($Al_2O_3$), titanium oxide ($TiO_2$) or magnesium oxide (MgO). When using these oxides for the production of high-quality refractory products according to prior art processes, such products were usually agglormerized, subjected to high-temperature sintering, and subsequently again prepared into grain sizes ranging from powder to particles of about 20 mm. The conversion of the powdered oxide into sintered granules is energy-intensive and very expensive. The method according to the present invention does not require this high energy procedure, which makes the basic oxide material enormously more expensive for the process of breaking up and sintering.

The present invention is illustrated further below in specific examples which are intended to further describe the invention without limiting its scope.

EXAMPLE 1

Re-ground metallurgical aluminum oxide having a grain size of less than 100 µum was mixed at 170° C. with a tar-pitch, the softening point of which (according to Kraemer & Sarnow as described in DIN 52025) is 75° C., in a ratio of 3 : 1, weight : weight. The still flowable substance was filled into tin plate containers, embedded in coke fines, and fired at 1000° C., with the heating rate being between about 4° C. and 6°C./h. The fired aluminum oxide-carbon-sintered cake had a gross density of approximately 2.0 g/cm$^3$, a true density of 3.28 g/cm$^3$, a compression strength of approximately 40 N/mm$^2$, and a carbon content of 19 percent by weight. The sintered cake was broken up and worked up into grain fractions of <1, 1-4, 4-8, and 8-16 mm. The gross density of the grain fractions ranged between about 2.7 and about 3.2 g/cm$^3$. By adding the above-mentioned fine-particle aluminum oxide to these $Al_2O_3$-C grain fractions, a new filler material was prepared containing the following components:

| | SIZE | |
|---|---|---|
| Fine-particle $Al_2O_3$ | <100 µm | = 20 percent by weight |
| $Al_2O_3$—C material | <1 mm | = 20 percent by weight |
| $Al_2O_3$—C | 1-4 mm | = 20 percent by weight |
| $Al_2O_3$—C | 4-8 mm | = 30 percent by weight |
| $Al_2O_3$—C | 8-16 mm | = 10 percent by weight |

The above-mentioned filler was mixed in at 170° C. to 180° C. with a pitch having a softening point of 75° C. The pitch addition was 15 percent by weight of the filler. The green, pitch-bound mixture was formed at 160° C. on a vibration compactor (Klockner Humboldt Deutz, KHD, Cologne, West Germany) into blocks and reached a forming density of 2.55 g/cm$^3$. The green formed bodies were fired to carbon bricks from room temperature to 1100° C. at a heating rate of approximately 5° C./h for 200 hours.

The fired bricks had the following average properties:

| | |
|---|---|
| $Al_2O_3$ content | 79 percent by weight |
| carbon content | 21 percent by weight |
| true density | 3.2 g/cm$_3$ |
| gross density | 2.5 g/cm$^3$ |
| porosity | 22% |
| gas permeability | 0.2 nPm |
| compression strength | 29 N/mm$^2$ |
| heat conductivity | 4.6 W/mK |

The fired bricks were tested by immersion in molten steel (or pig iron) in an alumina crucible at 1550° C. for 30 minutes. The evaluation of the test was performed in two ways: (a) carbon pick-up of the steel melt, (b) the shape of the sample after the test. A similar test was carried out with slags of definite composition in graphite crucibles. The results of the tests were as follows:
Pig iron and steel resistance: no visible attack by steel melt at 1550° C. in the immersion test Slag resistance: no visible attack by blast-furnace slag at 1550° C. in the test.

EXAMPLE 2

In Example 1, the starting material for the carboceramic brick, specifically the $Al_2O_3$-C sinter granulate, was composed of fine-particle calcined aluminum oxide of <100 μm particle size. It is, however, also possible to start with dried aluminum hydroxide, Al(OH)$_3$, in the production of the $Al_2O_3$-C sinter materials. In this case, the calcination of the hydroxide to the oxide is not needed and dehydration of the hydroxide is combined with the carbonization of the pitch or tar binder. This combination is possible because liberation of the hydroxide water largely takes place below the temperature (500° C.) at which the water vapor reacts with the binding carbon to form water gas ($CO+H_2$). The water gas reaction starts at approximately 600° C. At this temperature only unimportant residues of the hydroxide groups bound to the oxide are still present, which brings about a very slight carbon loss.

In reference to the above-mentioned embodiment using aluminum hydroxide an example is presented below.

Seventy-eight percent by weight of dried aluminum hydroxide (grain size <125 μum) was mixed with 2 percent by weight of petroleum coke powder and 20 percent by weight pitch (softening point 90° C.) at 180° C. The mixture was fired in the manner described above. A sintering material, which was sufficiently impermeable to liquids and gases (as determined by standard methods of testing well-known in the art) and was approximately 81 percent by weight of $Al_2O_3$ and approximately 19 percent by weight carbon, was obtained.

Alternative materials which may be employed in this embodiment of the present invention include, but are not limited to precipitated and dried magnesium hydroxide (Mg(OH)$_2$). In like manner, high-quality dried clays can be converted into carbon-bound fire clay according to the described method.

Other methods of agglomerating oxides and binder pitch may also be used to practice the present invention such as, for example, hot briquetting or hot pelletizing. Since the carbonized oxide/hydroxide pitch mixtures are electrically conductive due to their content of carbon (specified electrical resistances of the sinter products range between about 500 and about 2000 μΩm), electric resistance calcination in a reducing atmosphere can be used to achieve high calcining temperatures above 1200° C. However, the calcination temperatures may not exceed the carbothermal reduction temperatures of the oxides. The exact temperatures are dependent upon the type of oxide employed.

The refractory products of the invention are useful for lining vessels that are used to hold molten metallurgical mixtures.

The present invention has been described in reference to preferred embodiments. It would be apparent to one of ordinary skill in the art that many additions, deletions, and substitutions could be made without departing from the spirit and scope of the present invention as claimed below.

What is claimed is:

1. A method for the manufacture of refractory bricks containing refractory oxides and carbon which comprises:
    (A) mixing fine-particle refractory oxides with an effective amount of pitch to form a homogeneous green mixture,
    (B) coking and calcining said green mixture to form a solid thermally stable sintered product of oxide and carbon,
    (C) breaking up said sintered product to form grain fractions,
    (D) binding said grain fractions with a mixture of oxide and pitch,
    (E) compacting said bonded grain fractions into a green molded article, and
    (F) firing said green molded article in a reducing atmosphere to form refractory bricks.
2. The method of claim 1 wherein said bricks are prepared from the corresponding hydroxides of said refractory oxides.
3. The method of claim wherein said refractory oxides are selected from the group consisting of synthetic aluminum oxide, magnesium oxide, titanium oxide and zirconium
4. The method of claim 3, comprising mixing said oxide and pitch in Step A, with substances selected from the group consisting of coke, graphite and silicon powder, wherein said coke, graphite, and silicon powder is added in a total amount up to 50 percent by weight.
5. The method of claim 4, wherein the sintered product comprising a member selected from the group consisting of coke, graphite, and silicon powder is bound with pitch-containing mixtures in step D, the composition of which after the firing process E corresponds to that of the sintered product after step B.
6. The method of claim 5, wherein the pitch which acts as a binding agent fraction in the mixture of oxide and pitch comprises between about 15 and about 40 percent by weight of said mixture.
7. The method of claim 6, wherein the coking and calcining of the green mixture in step B comprises heating up to temperatures of 1700° C., wherein the heating rate between the temperatures of about 200° C. and about 600° C. is between about 2° C. and about 20° C. per hour.
8. The method of claim 7, wherein the coking and calcining of the green mixture in step B comprises electrical resistance heating.
9. The method of claim 1, wherein the refractory oxides comprise fine-particle pure oxides.
10. The method of claim 9, wherein said fine particle pure oxides are selected from the group consisting of aluminum oxide, magnesium oxide, silicon oxide, titanium oxide and zirconium oxide.
11. The method of claim 1, wherein said fine particle pure oxides are selected from the group consisting of calcined bauxite, mullite, zirconium sand and mixtures thereof.
12. The method of claim 2, wherein the hydroxide starting materials are selected from the group consisting of dried aluminum, magnesium hydroxide and high-quality dried clays.
13. The method of claim 1, wherein the maximum grain size of said oxides does not exceed 150 um.
14. The method of claim 2, wherein the maximum grain size of said hydroxide does not exceed 150 μm.
15. The method of claim 1, wherein the grain fractions of the worked up sintered product have grain sizes ranging between about 1 mm and about 16 mm.
16. The method of claim 2, wherein the grain fractions of the worked up sintered product have grain sizes ranging between about 1 mm and 16 mm.

* * * * *